July 12, 1955   F. L. JOHNSON   2,713,014
COMPOSITE LAMINATED PANEL AND METHOD OF ITS MANUFACTURE
Filed Jan. 2, 1952
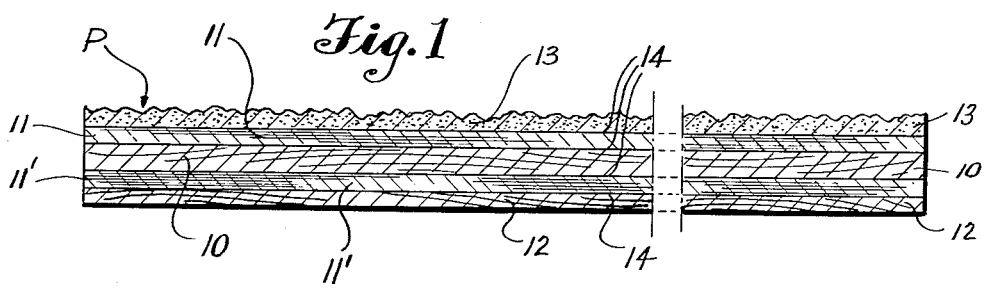
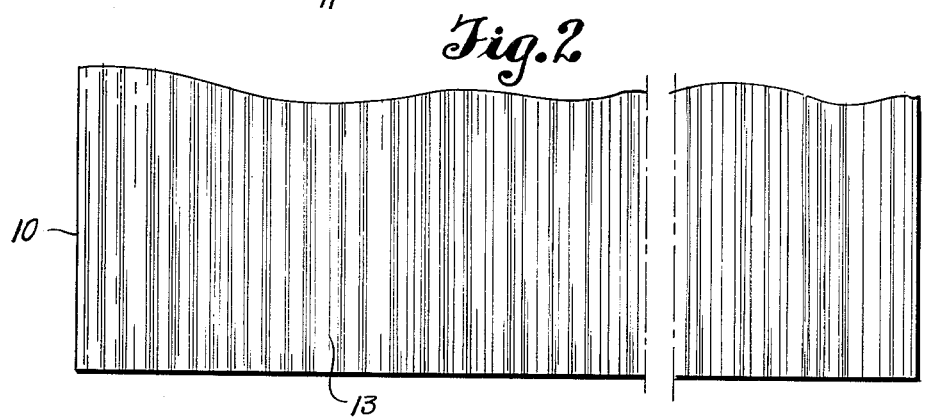
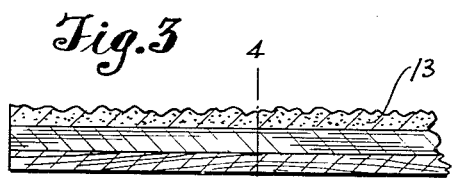 
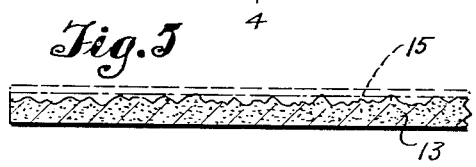 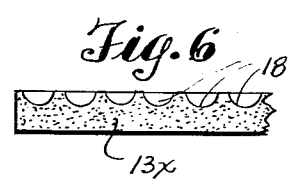
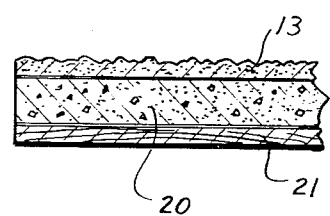
INVENTOR.
FRED L. JOHNSON
BY
Cook & Robinson
ATTORNEYS 2,713,014
Patented July 12, 1955

2,713,014

COMPOSITE LAMINATED PANEL AND METHOD OF ITS MANUFACTURE

Fred L. Johnson, Seattle, Wash.

Application January 2, 1952, Serial No. 264,404

4 Claims. (Cl. 154—106)

This invention relates to the processing or surfacing of hardboard sheets and to composite laminated panels that utilize the processed hardboard sheets of this invention in their manufacture; the present invention being based upon certain new and useful articles of manufacture and to the methods of their manufacture.

It has been a practice for many years to apply thin hardboard sheets to the surfaces of wood panels, particularly to surfaces of plywood panels that were intended for special uses, such for example, for the making of shelving, table tops, sink ledges, and the like. For such purposes, a sheet of hardboard of 1/8″ to 1/4″ in thickness is used, in lieu of the usually used wood ply, to form one surface of a plywood panel. While the application and use of such hardboard sheets in the making of special plywood panels has been quite satisfactory for the intended uses of the product, there have been certain objectionable features arising out of the fact that the composite article, surfaced on one side only with hardboard, was thereby "unbalanced" and warping resulted therefrom; unbalancing being due primarily to the fact that the physical characteristics of hardboard and wood are entirely different.

It has also been a practice over a period of years, to groove the surfaces of wooden shingles, and plywood panels for decorative purposes. Likewise, certain methods of grooving rotary cut wood veneer have been practised for the purpose of eliminating checking and cracking of the ply. One example of the decorative grooving of shingles, to give them the appearance of a hand split shake is shown in U. S. Patent No. 1,577,150, issued to Charles Putnam on March 16, 1926. Examples of plywood grooving both for decorative purposes and for the elimination of checking and cracking, are found in U. S. Patent Nos. 2,286,068 and 2,363,492, issued respectively to Donald Deskey on June 9, 1942, and to W. C. Bailey on November 28, 1944; the latter of these patents being concerned primarily with the method of balancing a laminated panel having one surface ply thereof formed of rotary cut wood veneer that is grooved parallel to the grain of the ply.

One of the primary objects of the invention is to so process a hardboard sheet that its natural tendency to warp under different or changing atmospheric conditions is eliminated.

Another of the primary objects of the invention is to provide, as an article of manufacture, a composite laminated panel, having at least one surface ply thereof comprised of a thin sheet of hardboard that has its outer surface processed for purpose of eliminating warping stresses in the hardboard sheet itself and also for eliminating any unbalancing of the panel that would result from use of a hardboard sheet to form one of its surfaces.

It is also an object of the present invention to provide a method of making composite laminated articles wherein one surface ply is a hardboard sheet.

While the problems of overcoming cracking and checking of surface forming plies of rotary cut wood veneer, and the balancing of plywood panels wherein one surface ply is grooved parallel to the grain thereof have been discussed in the patents of Deskey and Bailey above mentioned, it is not taught in either of these patents how to overcome the warping stresses that occur in hardboard sheets or in composite laminated panels that are surfaced on one side only with hardboard. Warpage that occurs in a sheet of hardboard is thought to be due primarily to the fact that, in its manufacture from wood fibers under the consolidating and coalescing action of heat and pressure simultaneously applied, one surface of the board is more densely formed than the other; this being due to the fact that during the sheet pressing operation, steam is caused to be vented from one side of the sheet only. Thus, the vented side, that can be identified by the imprint therein of the element through which the stem is vented, does not reach the temperature of the other side which is left smooth, hard and glossy by reason of the higher heat and its direct contact with the smooth surface of the pressing platen. Furthermore, the heat, at this side, being greater, causes the surface portion of the sheet to be more densely formed.

For the purpose of this application, the product, "hardboard" will be considered to be a rigid board or sheet of cellulose fibers that have been consolidated, compressed and coalesced under the action of heat and pressure by any of the usual methods of hardboard manufacture whereby one surface of the sheet is caused to be denser and harder than the other surface to the extent that the opposite surfaces have different characteristics that will result in warping of the board under varying atmospheric conditions.

The present invention will first be described in connection with use of hardboard as a surface forming material in the making of composite laminated panels of plywood for special uses. "Plywood" in this instance may be considered to be the present day product, made of rotary cut fir, although not confined thereto.

As distinguished from using rotary-cut plies of wood for making both surfaces a plywood panel, as in Deskey patent, or in the Bailey patent, I have, for various reasons, and for various uses, formed a composite laminated panel wherein one surface ply is formed of hardboard and the opposite ply is of rotary cut wood veneer.

It is well known in the lumber industry that hardboard is grainless and is not subject to cracking, checking or to any appreciable amount of contraction or expansion due to changing atmospheric conditions. However, when a hardboard sheet is adhesively applied to one face of a plywood panel, it operates to seal that face to more or less extent against passage of air or moisture and this sealing results in unbalancing the panel to which it has been applied.

I have found that the unbalancing of an ordinary plywood panel that is surfaced only on one side with hardboard applied with its glossy side outward, can be avoided by the cutting away of the dense, glossy surface portion of the hardboard sheet, such for example, as by forming closely placed grooves in the surface. However, the grooving requirements are herein differentiated from the requirements as given in the Deskey and Bailey patents, in that there is no directional requirement, nor is there any specific form of grooving required. It is believed that uniform removal of the hard, dense surface portion, in whole or in part, is primarily what is required to eliminate warping and this may be effected by sanding, shaving, grooving or by other methods of surface removal.

Grooving is the present preferred method of processing or surfacing the hardboard sheets because it produces the best effect from the decorative standpoint.

A hardboard sheet, being grainless, does not expand or contract under changes of weather in the manner, or to the extent, in any direction, as plywood. Furthermore, its hard, dense surface is not porous to the same extent as plywood and operates to seal to more or less extent that surface of the panel to which it is applied. It is believed that while, in present day manufacture of plywood, unbalancing is the result of using plies of different thickness on opposite faces of an otherwise balanced panel, the unbalancing that results from use of a hardboard ply on one side and a wood ply on the other is not primarily by reason of a possible difference in their thickness but by reason of these plies having entirely different physical characteristics, particularly in respect to porosity, grain, and density; furthermore, in the fact that the hard glossy surface of the hardboard sheet is more or less a moisture and air tight surface. It is to be assumed, however, that in such panels, the hardboard sheet would conform in thickness substantially to that of the corresponding opposite surface ply.

In accordance with this invention, unbalancing that results from use of a hardboard surface ply on a plywood panel can be avoided by removal of all or part of the hard glossy surface of the hardboard, that is, removal by such treatment as grooving, sanding or pitting; grooving being the preferred treatment because of its more decorative effect, and because it can be applied by use of common types of machines. However, should it be desired to effect removal of the surface portion of the hardboard ply in other ways, or to do so in a way to produce other ornamental surface effects, this should not be considered a departure from the gist of the invention so long as the uniform removal of the hard, dense surface portion is accomplished. Pitting, indenting or scratching through the hard surface will in most instances suffice. Also, embossing may be practical if so done as to break down the hard, dense surface layer.

Preferably the surface treating or grooving operation is done after the hardboard sheet has been glued to the plywood panel. However, that is not absolutely essential to a successful treatment.

In the accompanying drawings which illustrate the present article of manufacture—

Fig. 1 is a somewhat enlarged cross-sectional view of a portion of a composite, laminated panel principally of plywood, constructed in accordance with the objects of and embodying the features of the present invention therein.

Fig. 2 is a top view of the same, illustrating the surface grooving.

Fig. 3 is a cross-sectional view of a panel of an alternative form of construction embodied by this invention.

Fig. 4 is a cross-section on line 4—4 in Fig. 5.

Fig. 5 is a cross-sectional view of a hardboard sheet with the present preferred surface treatment, in accordance with this invention.

Fig. 6 is a cross-sectional view of a panel processed with another form of surface treatment.

Fig. 7 is a sectional view of a panel that has a core sheet of plaster board.

Referring more in detail to the drawings—

The five ply panel P, as shown in Fig. 1, is formed with a central core ply 10 of wood, here shown to be of substantial thickness, but not necessarily so, and disposed with its grain directed lengthwise of the panel. Glued to the opposite sides of the core ply 10 are wood plys 11 and 11', of lesser thickness than the core ply and disposed with their grain directed crosswise of the panel. To the face of the ply 11' a surface ply 12 of rotary cut wood veneer is glued, with its grain lengthwise of the panel. Likewise, glued to the top of ply 11 is a hardboard sheet 13 that has been surface treated or processed in accordance with the teaching of this invention. The glue lines in the composite panel have been designated by numeral 14.

The hardboard sheet 13, prior to its being surfaced by the grooving shown therein, was somewhat thicker than the complemental or corresponding wood ply 12, and was applied to the panel with its hard dense surface outward. This surface was later removed by a grooving operation and the thickness of the ply thus reduced to an average thickness corresponding substantially to that of ply 12.

In connection with the present surface treating operations, it will be further explained that the extremely hard, glossy surface portion of the hardboard sheet is relatively thin and merges gradually into the less dense body portion, and there is no exact or definite line of demarcation. However, for purpose of better understanding and explanation, I have indicated, in Fig. 5, an imaginary line of demarcation by the dot and dash line 15. The present surfacing or processing of the hardboard sheet, whether done before or after its being glued to the wood panel, is preferably effected by means of a high speed grooving head on a revolving spindle. The operation is so done that all or a substantial portion of the dense surface material, above line 15 in Fig. 5 is uniformly removed. The breaking up, or the removal of this dense, relatively non-porous portion of the hardboard sheet, eliminates the tendency of the hardboard sheet to warp and overcomes to the necessary extent for this invention, tendency of the panel to which the hardboard sheet is glued, to warp. Furthermore, the partial or entire removal of the dense surface of the board changes the characteristics of the board so that a substantial balance in the composite panel 10 is thereby effected.

Another form of processing or surface treatment is illustrated in Fig. 6 wherein the dense surface layer of the hardboard sheet 13x is shown to be removed in substantial part by a multiplicity of closely applied pits or recesses 18. These are formed by gouging or cutting out portions of the hard surface to a depth extending below the hard surface portion.

The breaking through or the removal of a substantial part of the hard, sealed surface of the hardboard sheet, is believed to be the governing act in obtaining balance in the board and in the panel to which the board is applied. For, by this operation, whether in grooving, pitting or otherwise, the characteristics of the hardboard sheet are so changed that it will balance the opposite face ply.

The present processing of hardboard sheets is desirable when such sheets are to be used for wall surfacing, even though not as a panel surfacing ply. The processing adds to the decorative value, and eliminates the unbalanced stresses in the board that cause warping.

It is practical also to surface panels of plaster board, or soft board such as that known as "Celotex" with the present processed hardboard sheets and in Fig. 7, I have shown a plaster board sheet 20 forming a core ply for a panel that is surfaced on one side with a wood veneer ply 21 and on its other side with the present, processed hardboard ply 13 here shown to be grooved after the fashion of the ply 13 in Fig. 1.

Having thus described my invention, what I claim as new therein, and desire to secure by Letters Patent, is:

1. The method of processing a hardboard panel of the type wherein one side embodies a hard layer of appreciable thickness and greater density than the other side produced in the formation of the panel, to eliminate warping stress, which method comprises cutting away the said hard layer to the full depth of the thickness thereof.

2. The method of processing a hardboard panel of the type having a dense hard layer of appreciable thickness produced in the formation of the panel, to eliminate warping stress, which method comprises cutting away in grooves or channels said hard layer through the full depth or thickness of said layer.

3. The method of making a composite laminated panel having at least three plies consisting of a center ply and opposite facing plies, said method comprising bonding one facing ply of wood veneer of predetermined thickness to one face of the center ply, bonding to the other face of the center ply a facing hardboard panel of an initial thickness greater than the thickness of the wood veneer ply and of the type having a dense hard layer of appreciable thickness produced in the formation of the panel, the hard layer of the hardboard panel being outermost, and then removing the dense hard layer by grooving to the full depth of the thickness thereof and thereby reducing the hardboard panel to an average thickness substantially corresponding to the thickness of the wood veneer ply.

4. A composite laminated panel comprising one or more plies forming a balanced body portion, a single ply secured to one side of the body portion and comprising wood veneer, and a single ply of hardboard material of the type having on one side a dense hard layer, secured to the other side of the body portion with the dense hard layer outward and said dense hard layer having closely spaced grooves and channels therein, the depth of which grooves and channels extends through the dense hard layer.

References Cited in the file of this patent

UNITED STATES PATENTS

| | | |
|---|---|---|
| 1,588,243 | Lewis | June 8, 1926 |
| 2,248,233 | Heritage | July 8, 1941 |
| 2,343,740 | Birmingham | Mar. 7, 1944 |
| 2,363,492 | Bailey | Nov. 28, 1944 |
| 2,419,614 | Welch | Apr. 29, 1947 |
| 2,541,497 | Buxbaum | Feb. 13, 1951 |
| 2,635,976 | Meiler | Apr. 21, 1951 |